M. Hiltz.
Fish Hook.

N⁰ 86,154.      Patented Jan. 26, 1869.

Witnesses:
S. N. Piper
F. P. Hale Jr.

Inventor:
Martin Hiltz
by his attorney
R. M. Eddy

United States Patent Office.

MARTIN HILTZ, OF GLOUCESTER, MASSACHUSETTS, ASSIGNOR TO HIMSELF AND LEONARD A. BURNHAM, OF SAME PLACE.

*Letters Patent No. 86,154, dated January 26, 1869.*

IMPROVEMENT IN FISH-HOOKS.

The Schedule referred to in these Letters Patent and making part of the same.

*To all persons to whom these presents may come:*

Be it known that I, MARTIN HILTZ, of Gloucester, in the county of Essex, and State of Massachusetts, have invented a new and useful Improvement in Fish-Hooks; and do hereby declare the same to be fully described in the following specification, and represented in the accompanying drawings, of which—

Figure 1:
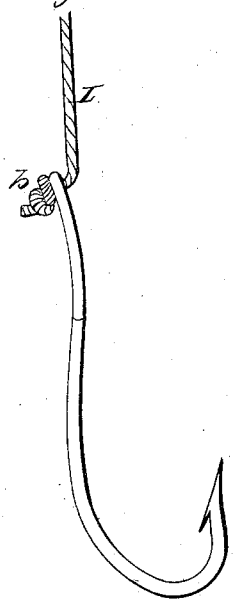

Figure 1 is a side elevation, and

Figure 2:

Figure 2, a front view of a fish-hook, as constructed in accordance with my invention.

My improvement has reference to the formation of the eye of the hook, the purpose of the improved eye being to enable the hook to be easily engaged with or disengaged from a line.

Instead of forming the hook with a single eye, of the shape usually adopted, (which is represented at $a$ in Figure 3, which is a side view of an eyed fish-hook,) I give to the eye the form as shown at A, in fig. 2, so as to construct the eye, not only with an opening, $a'$, sufficiently large to receive a knot, $b$, made on the end of the fishing-line L, (see fig. 1,) but with a tapering recess, $c$, leading from the eye, in manner as represented, such recess being, at or near its upper end, of a width equal to or a little greater than the diameter of the line L, and at and near its lower end of a width less than the said diameter.

The leg-portion, $d$, of the eye, owing to the bend $e$, and also to being disconnected at its end with that part of the shank next adjacent to such end, will be like a spring, so that after a fishing-line may have been introduced through the opening, $a'$, and pulled upward, the part $d$ will spring away under the draught on the line, and allow the line to pass into the upper part of the recess, wherein it will be held by the knot of the line and by the taper of the recess, the latter serving to prevent the line, under ordinary circumstances, from passing back into the opening, $a'$.

By seizing the hook in one hand, and the line with the other, and pulling the line downward, it may be drawn through the recess $c$ into the opening, $a'$, and thence out of the hook.

With my improved spring-eye hook, a fisherman can easily disengage his line from the hook while in the mouth of a fish, and afterward and quickly engage the line with another such hook freshly baited.

Thus he may give his whole attention to the catching of the fish, another person being employed to remove the hooks from the captured fish and rebait them, so that they may again be ready, when required for use, or the fisherman, while his line may be overboard, may himself remove the hook from the captured fish, and rebait such hook, so as to again render it ready for use.

By having the hook made with the knot-opening, $a'$, and the tapering recess $c$, formed by bending the upper portion of the shank of the hook, in manner as described and represented, the upper end of the shank is brought close down to the next adjacent part of the shank, and so curved that it will not be liable to catch or hook into grass or other matters while the hook may be in use.

My improvement saves the usual process of "gauging" a line to a hook, also the tying of the line, or inserting it through the eye and afterward knotting it, as is usually practised.

Figure 3:
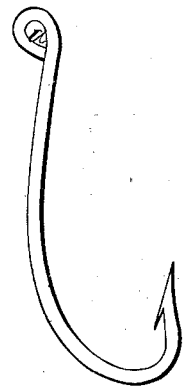

I make no claim to a fish-hook as constructed, with a plain eye, as indicated by fig. 3 of the above-mentioned drawings; but

I claim as my invention—

The eyed fish-hook, substantially as represented in figs. 1 and 2, and as hereinbefore described, that is, as having the eye A, formed with the knot-receiving opening $a'$, and the tapering recess $c$, or its equivalent, leading therefrom, as set forth.

MARTIN HILTZ.

Witnesses:
EDW. F. HOYT,
E. O. GAFFNEY.